January 11, 1966

3,228,839
PHARMACEUTICAL PREPARATIONS OF NEW TETRACOSAPEPTIDES, SALTS AND METAL COMPLEXES THEREOF
Heini Kappeler, Bettingen, and Robert Schwyzer, Riehen, Switzerland, assignors to Ciba Corporation, New York, N.Y., a corporation of Delaware
No Drawing. Filed Apr. 14, 1964, Ser. No. 359,759
Claims priority, application Switzerland, Apr. 19, 1963, 4,925/63
4 Claims. (Cl. 167—77)

The present application is a continuation-in-part of our copending application Serial No. 191,443, filed May 1, 1962.

The present invention provides the tetracosapeptides of the formula L-seryl-L-tyrosyl-L-seryl-L-methionyl-L-glutamyl-L-histidyl-L-phenylalanyl-L-arginyl - L - tryptophyl-glycyl-L-lysyl-L-prolyl-L-valyl-glycyl-L-lysyl-L-lysyl-L-arginyl-L-arginyl-L-prolyl-L-valyl-L-lysyl-L - valyl-L-tyrosyl-L-prolin ($\beta^{1-24}$-corticotropin) and the corresponding compound which contains the radical of glutamine instead of the glutamyl radical and their derivatives, acid addition salts, and heavy metal complexes, and pharmaceutical preparations containing the tetracosapeptide, a salt or derivative or a heavy metal complex thereof as active ingredient, and a process for the manufacture of these compounds and compositions. Heavy metal complexes are those of copper and cobalt, and especially those of zinc. The heavy metal complexes are composed of the tetracosapeptide and a sparingly soluble heavy metal compound, for instance the hydroxide, carbonate or phosphate, more especially zinc hydroxide, carbamate or phosphate. The complexes may contain more than one gram equivalent of heavy metal per gram mol of tetracosapeptide, for instance from 10 to 1000, preferably 400 to 1000, gram equivalents of heavy metal for each gram mol of tetracosapeptide.

The present application relates more especially to L-seryl-L-tyrosyl-L-seryl-L-methionyl-L-glutamyl-L-histidyl-L-phenylalanyl-L-arginyl-L-tryptophyl - glycl-L-lysyl-L-prolyl-L-valyl-glycyl-L-lysyl-L-lysyl-L-arginyl - L-arginyl-L-prolyl-L-valyl-L-lysyl-L-valyl-L-tyrosyl-L-prolin in pure form, its sparingly soluble zinc complexes and the corresponding glutaminyl compound.

Derivatives are above all functional derivatives such as esters, for example lower alkyl esters, e.g. methyl, ethyl, propyl, isopropyl, isobutyl, tertiary butyl ester, free and substituted benzyl ester, e.g. p-nitrobenzyl ester p-halogenobenzyl ester, p-phenylazobenzyl ester and p-methobenzyl ester, the amide and hydrazide, as well as N-substitution products such as N-acyl, for instance N-lower alkanoyl, more especially N-acetyl and N-tertiary butyloxycarbonyl derivatives and compounds containing other amino protecting groups, for instance, para-halogeno-carbobenzoxy, para-methoxycarbobenzoxy, para-phenylazobenzyloxycarbonyl and para(para'-methoxyphenylazo)-benzyloxycarbonyl.

The new compounds display a considerable adrenocorticotropic activity and are intended to be used in human and veterinary medicine as chemically pure and uniform compounds in place of ACTH. They do not contain the sensitizing phenomena associated with the natural preparations. Suitable for the preparation of synthetic corticotropine derivatives having a prolonged activity are in particular the aforementioned sparingly soluble zinc complexes. The compounds, especially the above mentioned derivatives, may also be used as intermediates for the manufacture of medicaments containing a longer chain of amino acids, such as the andrenocorticotropic hormones themselves.

The new tetracosapeptides are obtained by the methods known for the manufacture of peptides, for which purpose the amino acids may be linked together in the order of succession specified above singly or in the form of preformed small peptide units.

Inter alia, one of the amino acid molecules or peptide molecules in the form of an ester may be linked with a further molecule of an amino acid or peptide containing a protected amion group in the presence of a condensing agent such as a carbodiimide or a phosphorus acid ester halide, or the amino acid ester or peptide ester containing a free amino group may be reacted with an amino acid or a peptide containing an activated carboxyl group (and a protected amino group), for example an acid halide, azide, anhydride, imidazolide, isoxazolide (for example from N-ethyl-5-phenyl-isoxazolium-3'-sulfonate; see Woodward et al., J. Am. Chem. Soc, 89, page 1011 [1961]), or an activated ester such as cyanomethyl ester or carboxymethyl thiol ester. Conversely an amino acid or a peptide containing a free carboxyl group (and a protected amino group) can be reacted with an amino acid or a peptide containing an activated amino group (and a protected carboxyl group), for example with a phosphite amide. All aforementioned methods can be used for forming peptide bonds according to the present invention, but the processes used in the examples are particularly advantageous.

As mentioned above there are various possibilities available for synthesising the tetracosapeptide from the individual amino acids or small peptide units. According to one process, for example, the decapeptide L-seryl-L-tyrosyl - L-seryl-L - methionyl-L - glutamyl - (or glutaminyl)-L-histidyl-L-phenylalanyl - L-arginyl-L-tryptophyl-glycine is condensed with the tetradecapeptide L-lysyl-L-prolyl - L-valyl-glycyl-L - lysyl-L - lysyl-L - arginyl-L-arginyl-L - prolyl-L-valyl-L - lysyl-L-valyl-L - tyrosyl-L-prolin as represented, for example, in Table 1 for the compound containing as the fifth amino acid L-glutamic acid. In this Table BOC represents a tertiary butyloxycarbonyl group, tBu a tertiary butyl group and iBu an isobutyl group. The decapeptide used as starting material can be prepared by the process described in U.S. patent application No. 114,636, filed June 5, 1961, by R. Schwyzer et al.

The tetradecapeptide derivative is obtained, for example, by the reaction scheme shown in the Table 2.

Another useful tetradecapeptide derivative is obtained according to the scheme shown in Table 3. In these tables Z stands for carbobenzoxy, PZ for para-phenylazo-benyloxycarbonyl, T for trityl, Pht for phthalyl, PAB for paraphenylazobenzyl, PCB for pentachlorphenyl, Bzy for benzyl and ac for acetyl.

The tetracosapeptide is also obtained, for example by condensing the tetrapeptide L-seryl-L-tyrosyl-L-seryl-L-methionine with the eicosapeptide L-glutamyl-(or glutaminyl)-L-histidyl-L-phenylalanyl - L-arginyl-L-tryptophyl-glycyl-L-lysyl-L - prolyl-L-valyl-glycyl-L - lysyl-L-lysyl-L-arginyl-L-arginyl-L-prolyl-L - valyl-L-lysyl-L-valyl-L-tyrosyl-L-prolin, for example as shown in the Table 4.

TABLE 1

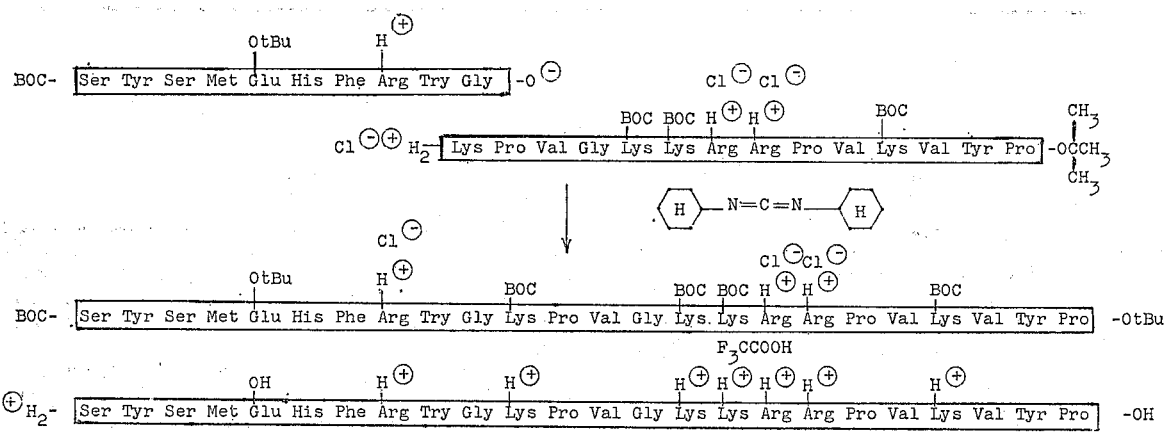

TABLE 2

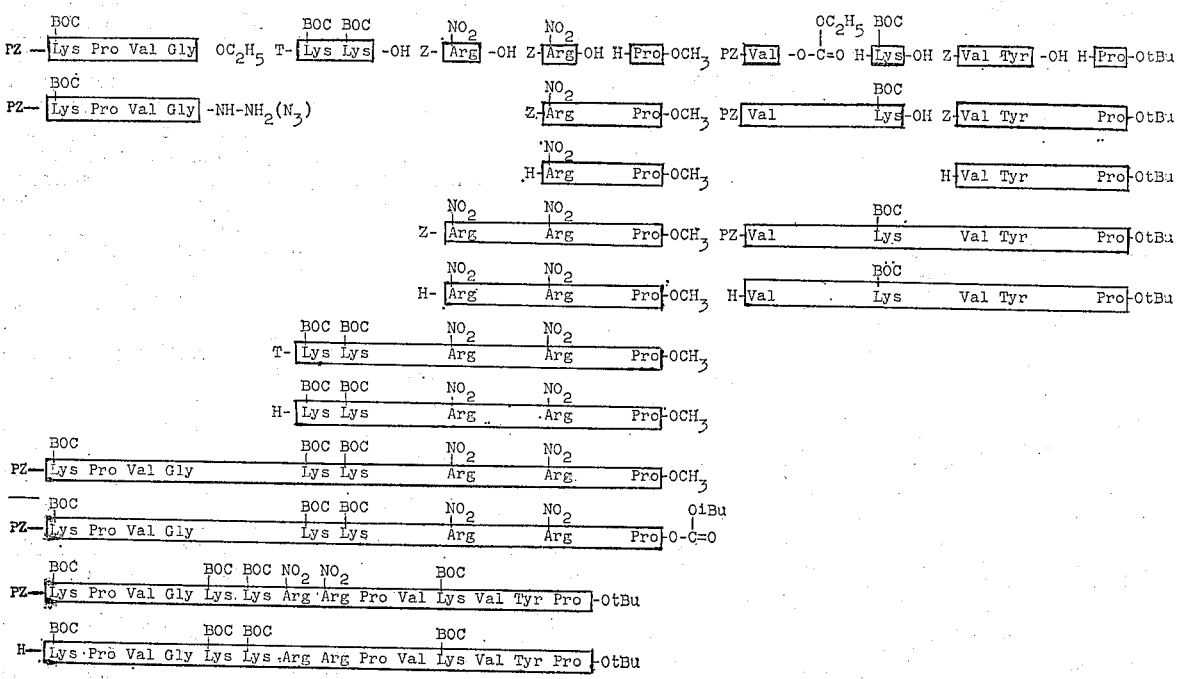

The tetrapeptide derivative used as starting material can be prepared by the process described in the aforementioned U.S. patent application No. 114,636 and the hexapeptide by the process of U.S. patent application No. 114,609, filed June 5, 1961, by R. Schwyzer et al.

Any free functional groups not participating in the reaction are advantageously protected, more especially by hydrolysing or reducing radicals that are easy to eliminate, thus the carboxyl group preferably by esterification (for example with methanol, tertiary butanol, a benzyl alcohol or para-nitrobenzyl alcohol), the amino group for example by introducing the tosyl or trityl radical or the carbobenzoxy group or a colored protective group, such as the para-phenylazo-benzyloxy-carbonyl group or the para-(para'-methoxy-phenylazo)-benzyloxy-carbonyl group or more especially the tertiary butyloxy-carbonyl radical. For protecting the amino group in the guanido grouping of arginine the nitro group may be used, but it is not absolutely necessary to protect the aforementioned amino group of arginine during the reaction.

The conversion of a protected amino group into a free group and the conversion of a functionally converted carboxyl group into a free carboxyl group in the course of the process used for the manufacture of the tetracosapeptides and intermediates is carried out in the known manner by treatment with a hydrolysing or reducing agent respectively.

Preferred methods for preparing the tetracosapeptide are described in our co-pending application, Serial No. 343,227, filed February 7, 1964, which is also a continuation-in-part of application Serial No. 191,443. The complexes are obtained by adding a water-soluble heavy metal salt, especially zinc salt, to the tetracosapeptide and then precipitating the complex by means of a base forming the hydroxide or carbonate, for instance an alkali metal hydroxide or carbonate especially sodium hydroxide or carbonate or ammonium hydroxide or carbonate or an alkali metal phosphate, especially tert. sodium phosphate, or ammonium phosphate. Preferably the complexes are precipitated in the presence of mannitol.

Depending on the reaction conditions used the new compounds are obtained in the form of bases or of their acid addition salts. From the salts the bases can be prepared in known manner. When the bases are reacted with acids suitable for forming therapeutically acceptable salts, there are obtained salts such, for example, as those of inorganic acids such as hydrohalic acids, for example hydrochloric or hydrobromic acid, perchloric, nitric or thiocyanic acid, sulfuric or phosphoric acids or organic acids such as formic, acetic, propionic, glycollic,

TABLE 3

```
                                                                    BOC
                                                          BOC  BOC(NO₂)(NO₂)
          OtBu              NO₂                                 ┌─────────────────────────────────────────────┐  BOC
BOC-[Ser Tyr Ser Met]-[Glu His Phe Arg Try Gly]-OH  H-[Lys Pro Val Gly Lys Arg Arg Pro Val Lys Val Tyr Pro]-OtBu

OtBu              NO₂                          BOC              BOC NO₂  NO₂              BOC
     Z-[Ser Tyr Ser Met]-[Glu His Phe Arg Try Gly]   Lys Pro Val Gly Lys Arg Arg Pro Val Lys Val Tyr Pro-OtBu

OtBu                                           BOC         BOC   BOC                      BOC
     Z-[Ser Tyr Ser Met]-[Glu His Phe Arg Try Gly]   Lys Pro Val Gly Lys Arg Arg Pro Val Lys Val Tyr Pro-OtBu

OtBu                                                            BOC                       BOC
     H-[Ser Tyr Ser Met]-[Glu His Phe Arg Try Gly]   Lys Pro Val Gly Lys Arg Arg Pro Val Lys Val Tyr Pro-OtBu

⊕
                                        H|                BOC
                                         ↓
                                        OH
                                         |
     H-[Ser Tyr Ser Met]-[Glu His Phe Arg Try Gly]-Lys-Pro-Val-Gly-Lys-Arg-Arg-Pro-Val-Lys-Val-Tyr-Pro-OH

BOC-[Ser Tyr Ser Met]-NH-NH₂(N₃)
``` lactic, pyruvic, oxalic, malonic, succinic, maleic, fumaric, malic, tartaric, citric, ascorbic, hydromaleic, dihydroxymaleic, benzoic, phenylacetic, 4-aminobenzoic, 4-hydroxybenzoic, anthranilic, cinnamic, mandelic, salicylic, 4-aminosalicylic, 2 - phenoxybenzoic, 2 - acetoxy - benzoic, methanesulfonic, ethanesulfonic, hydroxyethanesulfonic, benzenesulfonic, para - toluenesulfonic, naphthalenesulfonic or sulfanilic acid.

The tetracosapeptides obtained by the present process can be used in the form of pharmaceutical preparations containing the tetracosapeptide, its salts or metal complexes in admixture with an organic or inorganic pharmaceutical excipient suitable for enteral or parenteral, above all subcutaneous, administration. Suitable excipients are substances that do not react with the active ingredients such, for example, as gelatine, polyvinylpyrrolidone, lactose, glucose, pectine, sodium chloride, starches, magnesium stearate, talc, vegetable oils, benzyl alcohols, gums, poly-alkyleneglycols, white petroleum jelly, cholesterol or other known medicinal excipients. The pharmaceutical preparations may be, for example, in the form of lyophilized ampoules, or in liquid form as solutions, emulsions, or especially suspensions. The preparations are preferably administered in the form of injectable suspensions. There may be used ampouled suspensions ready for use or dry ampoules which on addition of water or an isotonic salt solution yield the injectable suspension. Dry ampoules may also be used which contain no alkaline additions, but contain only the $\beta^{1-24}$-corticotropin and a soluble zinc salt, e.g. zinc chloride sulfate or acetate and if desired, an auxiliary substance such as mannitol, and the corticotropin complex precipitated with an alkaline or phosphate solution just before us.

The preparations contain per dosis unit from 0.2 to 1.0 mg. of L-seryl-L-tyrosyl-L-seryl-L-methionyl-L- glutamyl (or L - glutaminyl) - L-histidyl-L-phenylalanyl-L-arginyl - L - tryptophyl - glycyl-L-lysyl-L-prolyl-L-valyl-glycyl-L-lysyl-L-lysyl-L-arginyl-L-arginyl - L - prolyl-L-valyl-L-lysyl-L-valyl-L-tyrosyl-L - proline. A preferred suspension contains per one-ml. ampoule 0.5 mg. of $\beta^{1-24}$-corticotropin hexa-acetate and 6.6 mg. of zinc hydroxide or the equivalent amount of zinc phosphate or zinc carbonate. The preparations may be sterilized and/or may contain assistants such as preserving, stabilizing, wetting or emulsifying agents. They may further contain other therapeutically useful substances.

The following examples illustrate the invention.

For paper chromatography the following systems were used:

System 40: n-butanol+ethanol+water (2:2:1)
System 43: tertiary amyl alcohol+isopropanol+water (100:40:55)
System 45: secondary butanol+3% ammonia (100:44)
System 49: secondary butanol+triethylamine+diethylbarbituric acid + water + isopropanol (100:0.8:1.8 g.:60:10)
System 52: n-butanol+acetic acid+water (100:10:30)
System 53: n-butanol+formic acid+water (480:6:314)
System 54: secondary butanol+isopropanol+monochloracetic acid+water (70:10:3 g.:40)
System 56: secondary butanol+isopropanol+5% veronal sodium in water (100:15:10:60)
System 87: isopropanol+formic acid+water (400:20:60)
System 100: ethyl acetate+pyridine+acetic acid+water (60:20:6:11)
System 101: n-butanol+pyridine+acetic acid+water (30:20:6:24)
System 102: ethyl acetate+methylethyl ketone+formic acid+water (50:30:10:10).

*Example 1*

PZ-Lys-(BOC)-Pro-Val-Gly-NH-NH₂

A mixture of 1.15 grams (1.5 millimols) of PZ-Lys-(BOC)-Pro-Val-Gly-OCH₃ (U.S. patent application No.

TABLE 4

| | | | | | | | | | Pht | | | | |
|---|---|---|---|---|---|---|---|---|---|---|---|---|---|
| BOC-[Lys]-OPCB | BOC-[Arg]-OH | Z-[Arg]-OH | H-[Pro]-OCH₃ | BOC-[Val]-OH | BOC-[Lys]-OH | BOC-[Val]-OH | BOC-[Tyr]-OH | H-[Pro]-OPAB | | | | | |
| | | Z-[Arg — Pro]-OCH₃ | | | | | BOC-[Tyr — Pro]-OPAB | | | | | | |
| | | H-[Arg — Pro]-OCH₃ | | | | | H-[Tyr — Pro]-OPAB | | | | | | |
| | BOC-[Arg — Arg — Pro]-OCH₃ | | | | | BOC-[Val — Tyr — Pro]-OPAB | | | | | | | |
| | BOC-[Arg — Arg — Pro]-OH | | | | | H-[Val — Tyr — Pro]-OPAB | | | | | | | |
| | | | | | | BOC-[Lys(Pht) — Val — Tyr — Pro]-OPAB | | | | | | | |
| | | | | | | H-[Lys(Pht) — Val — Tyr — Pro]-OPAB | | | | | | | |
| | | | | BOC-[Val — Lys(Pht) — Val — Tyr — Pro]-OPAB | | | | | | | | | |
| | | | | BOC-[Val — Lys(Pht) — Val — Tyr(ac) — Pro]-OPAB | | | | | | | | | |
| | | | | H-[Val — Lys(Pht) — Val — Tyr(ac) — Pro]-OPAB | | | | | | | | | |
| | BOC-[Arg — Arg — Pro — Val — Lys(Pht) — Val — Tyr(ac) — Pro]-OPAB | | | | | | | | | | | | |
| | H-[Arg — Arg — Pro — Val — Lys(Pht) — Val — Tyr(ac) — Pro]-OPAB | | | | | | | | | | | | |
| BOC-[Lys(Pht) — Arg — Arg — Pro — Val — Lys(Pht) — Val — Tyr(ac) — Pro]-OPAB | | | | | | | | | | | | | |
| H-[Lys(Pht) — Arg — Arg — Pro — Val — Lys(Pht) — Val — Tyr(ac) — Pro]-OPAB | | | | | | | | | | | | | |

| | | | | |
|---|---|---|---|---|
| BOC-[Lys(Pht)]-OH | H-[Pro]-OBzy | BOC-[Val—Gly]-OH | BOC-[Lys(Pht)]-OPCB | H-[Lys Arg Arg Pro Val Lys(Pht) Val Tyr(ac) Pro]-OPAB |
| BOC-[Lys(Pht) — Pro]-OBzy | | | | |
| BOC-[Lys(Pht) — Pro]-OH | | | | |
| | | | BOC-[Lys(Pht) — Lys Arg Arg Pro Val Lys(Pht) Val Tyr(ac) Pro]-OPAB | |
| | | | H-[Lys(Pht) — Lys Arg Arg Pro Val Lys(Pht) Val Tyr(ac) Pro]-OPAB | |
| | | BOC-[Val Gly — Lys — Lys Arg Arg Pro Val Lys(Pht) Val Tyr(ac) Pro]-OPAB | | |
| | | H-[Val Gly — Lys — Lys Arg Arg Pro Val Lys(Pht) Val Tyr(ac) Pro]-OPAB | | |
| BOC-[Lys(Pht) — Pro — Val Gly — Lys — Lys Arg Arg Pro Val Lys(Pht) Val Tyr(ac) Pro]-OPAB | | | | |
| H-[Lys(Pht) — Pro — Val Gly — Lys — Lys Arg Arg Pro Val Lys(Pht) Val Tyr(ac) Pro]-OPAB | | | | |

46893, filed August 2, 1960, by R. Schwyzer et al.), 15 cc. of absolute methanol and 0.6 cc. of hydrazine hydrate is refluxed for one hour, evaporated to dryness and the hydrazide is precipitated with much ether. The initially gelatinous product solidifies when scratched with a glass rod. It is filtered off and thoroughly washed with ether on the suction filter. After drying over sulfuric acid there are obtained 1.1 grams of PZ-tetrapeptide hydrazide melting at 130 to 131° C.

A specimen recrystallized from acetonitrile has the melting point F=163–165° C. The hydrazide is readily soluble in cold acetic acid of 25% strength.

*Example 2*

Z-Arg-(NO₂)-Pro-OCH₃

3.06 grams (23.7 millimols) of proline methyl ester in 20 cc. of acetonitrile are aded to a solution of 7.18 grams (20.3 millimols) of carbobenzoxy-nitro-L-arginine in 20 cc. of dimethylformamide. The mixture is cooled with ice and sodium chloride to about —5° to —10° C. and then treated with a solution of 4.9 grams of dicyclohexyl carbodiimide in 12 cc. of dimethylformamide:acetonitrile=1:1. The reaction solution is then diluted with 20 cc. of ice-cold acetonitrile and kept for 17 hours at 0° C. The urea formed is filtered off, washed with acetonitrile and the solution is treated with 5 drops of glacial acetic acid. After 30 minutes the whole is evaporated to dryness, the residue taken up in ethyl acetate, the precipitated urea is once more filtered off through cotton wool and the ethyl acetate solution is washed with 3 x 10 cc. of N-hydrochloric acid, then twice with water and finally with n-sodium bicarbonate solution until, when the alkaline extracts are acidified, no turbidity appears; finally the whole is washed with water until neutral.

When the dried ethyl acetate solution is concentrated to a small volume, the carbobenzoxy dipeptide ester precipitates substantially quantitatively. Yield: 6.16 grams (65.5% of the theoretical). The product melts at 155 to 157° C. after having sintered at 153° C.

*Example 3*

H-Arg-(NO₂)-Pro-OCH₃

8.4 grams of Z-Arg(NO₂)-Pro-OCH₃ are dissolved with heating in 27 cc. of glacial acetic acid and then treated at room temperature with 27 cc. of approximately 4 N-hydrogen bromide solution in glacial acetic acid. After one hour the whole is concentrated in vacuum at 40° C. to a small volume and the decarbobenzoxy solution product is precipitated with much absolute ether. The initially tacky product is treated with absolute ether until it forms a fine powder. For purification the dihydrobromide of the dipeptide ester is once more precipitated from methanol+ether. The pale yellowish compound is taken up in 4 cc. of water, 150 cc. of chloroform are added and the mixture is cooled to 0° C. in an ice bath. While whirling the mixture vigorously, solid potassium carbonate is added in portions until all water has been consumed and the postassium carbonate separates in solid form; the latter is once more extracted with fresh chloroform and the combined chloroform extracts are dried over anhydrous potassium carbonate and filtered through a little Celite in a G₄ glass suction filter. After having evaporated the chloroform at 40° C. there are obtained 5.5 grams (=90% of the theoretical yield) of nitro-L-arginylproline methyl ester. The compound is further worked up as it is.

*Example 4*

Z-Arg(NO₂)-Arg(NO₂)-Pro-OCH₃

8.34 grams (25.2 millimols) of H-Arg(NO₂)-Pro-OCH₃ in 25 cc. of freshly distilled dimethylformamide are combined with a solution of 8.92 grams (25.2 millimols) of Z-Arg(NO₂)-OH, and the mixture is diluted with 50 cc. of acetonitrile and then cooled to —10° C. The whole is kept for 30 minutes at —10° C. and then treated while being stirred with a solution of 5.71 grams (27.7 millimols) of dicyclohexyl-carbodiimide in 12.5 cc. of ice-cold acetonitrile and the whole is allowed to react for 22 hours at 0° C. The urea is filtered off and the filtrate is concentrated in vacuum to a small volume. The syrupy residue is taken up in chloroform, washed with 3×10 cc. of N-hydrochloric acid, then with 2×10 cc. of water and finally with N-sodium bicarbonate solution and N-sodium carbonate solution until, when the alkaline extracts are acidified, no more precipitate or turbidity appears. Finally, the chloroform extracts are washed neutral with water and dried over sodium sulfate and evaporated, to yield 10.4 grams (=62% of theory) of crude carbobenzoxy-tripeptide ester.

When a sample of the crude product is subjected to scission with 2 N-hydrogen bromide solution in glacial acetic acid for one hour at room temperature there appears in the paper chromatogram in the systems 54 and 49 apart from the tripeptide also a further amount of nitro-arginine and another by-product. For purification 4.6 grams of the crude product are crystallized from 140 cc. of butanol. Yield: 2.2 grams of pure carbobenzoxy-tripeptide ester melting at 120° C. with decomposition. Optical rotation $[\alpha]_D^{26}=-43.9°\pm1°$ (c.=1.032 in methanol).

The ultra-violet spectrum of the carbobenzoxy-tripeptide ester displays at 271 mµ the maximum typical of nitroarginine ($\epsilon=32,200$).

Example 5

H-Arg(NO₂)-Arg(NO₂)-Pro-OCH₃

A mixture of 2.19 grams (3.3 millimols) of Z-Arg-(NO₂)-Arg(NO₂)-Pro-OCH₃ and 13.2 cc. of 2 N-hydrobromic acid solution in glacial acetic acid is decarbobenzoxylated for one hour at room temperature. The excess acid is evaporated and the decarbobenzoxylation product is precipitated with much absolute ether. The crude product is taken up in 2 cc. of water, extracted twice with fresh ethyl acetate, the ethyl acetate phases are once again washed with water and the combined aqueous solutions are poured over a column of ion-exchanger, Merck II. The free tripeptide ester is eluted with 200 cc. of water and the water is then evaporated in vacuum at 40° C. Yield: 1.3 grams (=74% of the theoretical).

The paper chromatogram in the systems 43, 49 and 54 of the free tripeptide ester produces with ninhydrin only one positive spot each. $R_f$ values: 43/0.42, 49/0.67 and 54/0.49.

Example 6

T-Lys-(BOC)-Lys(BOC)-Arg(NO₂)-Arg(NO₂)-Pro-OCH₃

1.07 grams (2.01 millimols) of H-Arg(NO₂)-Arg(NO₂)-Pro-OCH₃ in 16.5 cc. of a 1:1-mixture of dimethylformamide and acetonitrile are cooled to —10° C. While stirring the mixture vigorously there are rapidly added 1.44 grams of T-Lys(BOC)-Lys(BOC)-OH (afore-mentioned U.S. patent application No. 46,893), the whole is diluted with 10 cc. of previously cooled acetonitrile and after 10 minutes 456 mg. (2.2 millimols) of dicyclohexyl carbodiimide in 5 cc. of ice-cold acetonitrile are added. The mixture is allowed to react for 20 hours at 0° C.; the urea is then filtered off and the filtrate is evaporated in vacuum at 40° C. The unreacted tripeptide ester is precipitated with much ethyl acetate and the ethyl acetate solution is then evaporated to dryness and the residue is taken up in a small amount of acetone. The mixture is filtered through cotton wool and the N-trityl-pentapeptide ester is precipitated with much ether.

A specimen of the trityl-pentapeptide ester split with anhydrous trifluoroacetic acid reveals in the paper chromatogram in the system 49, in addition to the pentapeptide methyl ester ($R_f$=0.29), a very small amount of the two starting materials [dipeptide - H - lys - lys - OH ($R_f$=0.12) and tripeptide ester nitro-arginyl-nitro-arginyl-proline methyl ester ($R_f$=0.53)].

For analysis 200 mg. of the product are subjected to a Craig distribution over 100 stages between methanol of 80% strength and a 1:1-mixture of chloroform and carbon tetrachloride. The bulk of the substance (180 mg.) is found in stages 16–28 which are combined and once more precipitated from acetone+ether. Melting point: 134–136° C. Optical rotation $[\alpha]_D^{26}=-41.20+0.4°$ (c.=2.709 in methanol). Ultra-violet spectrum: $\lambda_{max}$ 271 mµ, $\epsilon=32,500$, in absolute alcohol.

Example 7

H-Lys(BOC)-Lys(BOC)-Arg(NO₂)-Arg(NO₂)-Pro-OCH₃

1.46 grams (1.19 millimols) of N$^\alpha$-trityl-pentapeptide methyl ester (Example 6) in 50 cc. of acetic acid of 75% strength are subjected to splitting for 45 minutes at 30° C.; the acetic acid is then evaporated in a high vacuum at 30° C. and the residue is distributed between acetic acid of 1% strength and ether. On evaporation of the ethereal solution a quantitative yield of triphenyl carbinol is obtained. The acetic acid solution is likewise evaporated in a high vacuum at 40° C. and the residue distributed in a separating funnel between butanol and N-sodium carbonate solution. The pH value of the aqueous phase must be 8.5. The butanol extracts are washed with water until neutral and then dried over sodium sulphate. Yield: 1.03 grams (=88% of the theoretical).

The compound is used for further working up without first having been purified.

Example 8

PZ-Lys(BOC)-Pro-Val-Gly-Lys(BOC)-Lys(BOC)-Arg(NO₂)-Arg(NO₂)-Pro-OCH₃

A mixture of 900 mg. (1.2 millimols) of PZ-Lys-(BOC)-Pro-Val-Gly-hydrazide and 10 cc. of dimethylformamide is cooled to —° C. 4 cc. of N-hydrochloric acid are then slowly run in, whereupon 1.4 cc. of ice-cold N-sodium nitrite solution are vigorously stirred in dropwise at —10° C. After 30 seconds the azide begins to separate out as a sticky substance. The mixture is allowed to react for another 3 minutes at —10° C. and then treated with 150 cc. of ice water. The tacky azide, which is difficult to filtrate, is extracted with ice-cold ethyl acetate and the ethyl acetate phases are washed 3 times with water until neutral, then dried in the cold over magnesium sulfate and filtered through a cold G₄-glass suction filter into an ice-cooled solution of 1.03 grams (about 1 millimol) of H-Lys(BOC)-Lys(BOC)-Arg-(NO)₂-Arg(NO₂)-Pro-OCH₃. The mixture is allowed to react for 22 hours at 0° C. and then for 3 hours at 30° C. The reaction solution is washed with 40 cc. of water, then with 4×10 cc. of acetic acid solution of 1% strength, then with 5×10 cc. of N-sodium bicarbonate solution and finally with water and saturated sodium chloride solution. On evaporation of the dried solution the nonapeptide derivative settles out. Yield: 1.70 grams of crude product.

For purification of 1.52 grams of the crude product are taken up in a small amount of chloroform and then filtered through a column of 45 grams of silica gel. One reprecipitation of the eluate from 10 cc. of chloroform with ether yields 1.06 grams of PZ-nonapeptide methyl ester, melting at 134 to 140° C. with decomposition.

In the thin-layer chromatogram (silica gel G; product of Merck) in the system dioxane:water=9:1 only one substance of $R_f$ value 0.75 can be identified. In the systems chloroform:acetone=7:3 and benzene:acetone=1:1 the compound remains at the starting point. The substance, crystallized from acetonitrile, melts at 136–138° C.; it exhibits in the UV-spectrum in ethanol maxima at $\lambda=$ 272 mµ ($\epsilon=26,600$) and $\lambda=320$ mµ ($\epsilon=22,400$).

Example 9

PZ-Lys(BOC)-Pro-Val-Gly-Lys(BOC)-Lys(BOC)-Arg(NO₂)-Arg(NO₂)-Pro-OH

A mixture of 1.06 grams (0.62 millimols) of PZ-nonapeptide ester (Example 8), 6 cc. of dioxane of 75% strength and 1.24 cc. of 1.95 N-sodium hydroxide solution is hydrolysed for 15 minutes at room temperature. The reaction solution is then poured into 110 cc. of ice water containing 2.5 cc. of N-hydrochloric acid and the floccular precipitate is filtered through a G₃ glass suction filter. The precipitate is thoroughly washed with water and then dried over phosphorus pentoxide in a high vacuum to yield 970 mg. of an amorphous product. $R_f$ value in the thin-layer chromatogram=0.52 for dioxane:water=9:1

200 mg. of the product distributed over 121 stages in the system methanol:water:chloroform:carbontetrachloride=8:2:5:5 yield 162 mg. of the pure peptide derivative of K-value=0.65.

Ultra-violet spectrum in absolute alcohol:$\lambda_{max}$ 320 m$\mu$ ($\epsilon$=21,700) and 271 m$\mu$ ($\epsilon$=37,200).

The substance, crystallized from acetonitrile, melts at 140–145° with decomposition.

Example 10

PZ-Val-Lys(BOC)-OH

A mixture of 4.75 grams (13.4 millimols) of PZ-valine and 65 cc. of absolute dioxane is cooled in ice water in a manner such that part of the dioxane is solid. There are then added 3.45 cc. (14.4 millimols) of N-tributylamine and after another 5 minutes 1.38 cc. (13.4 millimols) of chloroformic acid ethyl ester and the whole is allowed to react for 15 minutes while being cooled.

4 grams (17.2 millimols) of N$^\epsilon$-BOC-lysine are slowly stirred into 32 cc. of water containing 2.45 cc. (17.2 millimols) of N-triethylamine. The last portions of N$^\epsilon$-BOC-lysine do not dissolve readily. On cooling with ice a small amount of solid matter separates again from the aqueous solution. This solution is rapidly added with vigorous stirring and cooling to the freshly prepared solution of the mixed anhydride and the mixture is allowed to react for 30 minutes at room temperature. The reaction solution is concentrated in vacuum at 40° C. to a small volume and then treated, while being cooled with ice, with 100 cc. of water and 40 cc. of citric acid solution of 10% strength. When the smeary precipitate is rubbed with ether it turns solid. The crude PZ-valyl-N$^\epsilon$-BOC-lysine is filtered off, washed copiously with water and ether and dried in a high vacuum at 50° C. Yield: 4.41 grams. Melting point: 167–169° C. (after sintering at 165° C.).

The ethereal phase is separated and dried over sodium sulfate. When the ether is evaporated, another 1.07 grams of the PZ-dipeptide separate; melting point 167–169° C. The total yield amounts to 5.48 grams (=70% of the theoretical). After having been crystallized once from ethyl acetate the analytical fraction melts at 167–169° C.

The ultra-violet spectrum in absolute alcohol displays maxima at 230 m$\mu$ ($\epsilon$=13,400) and at 322 m$\mu$ ($\epsilon$=23,000).

Example 11

Z-Val-Tyr-Pro-OtBu 11.25 grams (27.4 millimols) of carbobenzoxy-valyl-tyrosine (U.S. Patent No. 2,978,444, granted April 4, 1961, to R. Schwyzer et al.), in 100 cc. of freshly distilled acetonitrile are mixed with a solution of 4.65 grams (27.4 millimols) of proline tertiary butyl ester in 25 cc. of acetonitrile and cooled in an ice bath to 0° C. A solution of 6.21 grams of dicyclohexyl carbodiimide in 10 cc. of cold acetonitrile is then added and the mixture is allowed to react for 15 hours at 0° C. The urea which crystallizes out is filtered off (yield: 90% of the theoretical) and the reaction solution is mixed with 1 cc. of glacial acetic acid. After 15 minutes the acetonitrile is evaporated in vacuum, the residue is taken up in ethyl acetate and the precipitated urea is once more filtered off. The ethyl acetate solution is extracted with 2×10 cc. of ice-cold 2 N-hydrochloric acid, and then with 2 N-sodium carbonate solution until an acidified sample no longer produces a precipitate, and finally with water until neutral. The ethyl acetate extracts are dried over sodium sulfate and evaporated under diminished pressure. Yield: 14.1 grams (=88% of the theoretical) of amorphous carbobenzoxy-tripeptide ester.

This carbobenzoxy-tripeptide ester is readily soluble in most organic solvents except ether, petroleum ether and benzene. It is further worked up without first having been purified.

Example 12

H-Val-Tyr-Pro-OtBu 14.13 grams (24.9 millimols) of Z-Val-Tyr-Pro-OtBu in 250 cc. of methanol of 90% strength containing 4.5 cc. of glacial acetic acid are subjected to hydrogenolytic splitting in the presence of 2 grams of palladium-carbon catalyst of 10% strength. The liberated carbon dioxide is absorbed with potassium hydroxide solution in a second interposed duck-shaped hydrogenation vessel. After 2 hours no more hydrogen is being taken up. The catalyst is filtered off and the filtrate is evaporated to dryness in vacuum at 40° C.; the residue is distributed between 200 cc. of ethyl acetate and 2×20 cc. of ice-cold 2 N-sodium carbonate solution. The sodium carbonate solutions are once more extracted with fresh ethyl acetate and the ethyl acetate extracts are washed with water until neutral and then dried over sodium sulfate. Evaporation in vacuum yields 7.69 grams (=71% of theory) of the free tripeptide ester.

In the paper chromatogram in the systems 43, 45 and 54 the tripeptide ester migrates with the solvent front and produces with ninhydrin and Pauly reagent one spot each.

Example 13

PZ-Val-Lys(BOC)-Val-Tyr-Pro-OtBu

A solution of 10.36 grams (17.7 millimols) of PZ-Val-Lys(BOC)-OH and 7.69 grams (17.7 millimols) of H-Val-Tyr-Pro-OtBu in 140 cc. of freshly distilled dimethyl-formamide is treated at 0° C. with 4.2 grams of dicyclo-hexyl carbodiimide (15% excess) in 12 cc. of dimethyl-formamide, and the whole is kept for 2 days at 0° C. The urea is filtered off and the filtrate mixed with 0.5 cc. of glacial acetic acid and left to itself for another 30 minutes. The solvent is then evaporated in vacuum to leave a small volume and the syrupy residue is taken up in much ethyl acetate. The ethyl acetate phase is washed with 4×25 cc. of 0.2 N-ammonium hydroxide solution, 2×3 cc. of water, 2×30 cc. of ice-cold citric acid solution of 10% strength and finally with water until it is neutral. After drying with sodium sulfate and evaporating the solvent there are obtained 17 grams of crude amorphous reaction product. For purification the crude product is dissolved in 100 cc. of chloroform and the solution is poured over a silica gel column (570 grams; diameter 5.6 cc., 41 cm. high) disactivated with 10% of water. On elution with chloroform the orange-red zone migrates slowly, whereas with 2:1 chloroform+ethyl acetate 2 fractions can be eluted.

The first fraction (4.8 grams) is still considerably contaminated with dicyclohexylurea and PZ-dipeptide and can be crystallized from acetonitrile only in a poor yield, whereas the second fraction (7.2 grams) is again obtained as a gelatinous precipitate from 200 cc. of acetonitrile. Yield: 5.1 grams of PZ-pentapeptide ester melting at 154–158 ° C.

The analytically pure fraction, obtained by a further crystallization, melts at 157–159° C.

The ultra-violet spectrum of the compound in absolute alcohol displays maxima at 227 mμ (ε=20,700) and 322 mμ (ε=21,100).

In the thin-layer chromatogram (silica gel G; product of Merck) the $R_f$-values revealed are: 0.23 (chloroform+acetone 95:5) and 0.60 (benzene+acetone 1:1).

Example 14

H-Val-Lys(BOC)-Val-Tyr-Pro-OtBu

A mixture of 1.4 grams of PZ-Lys(BOC)-Val-Tyr-Pro-OtBu, 100 cc. of methanol and 400 mg. of palladium-carbon catalyst of 10% strength is shaken for 6 hours in an autoclave with hydrogen under 5 atmospheres pressure. The catalyst is filtered off, repeatedly washed with methanol and the solvent is evaporated in vacuum. The residue is triturated with much ether and dried in a high vacuum. 980 mg. of a fine, amorphous powder is obtained.

In the systems 54 and 49 the compound migrates with the solvent front.

The $R_f$ value is 0.65 in the thin-layer chromatogram (silica gel G) in the system dioxane+water 9:1.

Example 15

PZ-Lys(BOC)-Pro-Val-Gly-Lys(BOC)-Lys(BOC)-Arg(NO₂)-Arg(NO₂)-Pro-Val-Lys(BOC)-Val-Tyr-Pro-OtBu 276 mg. (0.16 millimol) of PZ-Lys-Pro-Val-Gly-Lys (BOC) - Lys(BOC) - Arg(NO₂)-Arg(NO₂) - Pro-OCH₃ (dried over phosphorous pentoxide in a high vacuum at 80° C.) are dissolved in a mixture of 1 cc. of absolute dimethylformamide and 2 cc. of absolute tetrahydrofuran and the whole is cooled to −10° C. in a cooling bath of ice and sodium chloride. 0.16 millimol of triethylamine in 1.6 cc. of tetrahydrofuran is then added and after 5 minutes 0.16 millimol of chloroformic acid isobutyl ester in 1.6 cc. of absolute tetrahydrofuran is introduced. The whole is allowed to react in the cooling bath for 15 minutes and then treated with a solution of 140 mg. of H-Val-Lys(BOC)-Val-Tyr-Pro-OtBu in 2 cc. of absolute tetrahydrofuran, stirred for 15 minutes in an ice bath and then for 1 hour at room temperature; the solvent is then evaporated in vaccum at 40° C and the reaction product is precipitated with much ether. The dried crude product (395 mg.) in 4 cc. of alcohol-free chloroform is poured over a column of alumina (activity III; 40 grams) and eluted with 100 cc. of chloroform. The yellow zone containing the peptide derivative migrates slowly. The whole is then eluted with 80 cc. of chloroform+methanol 95:5, to yield 290 mg. of chromatographically unitary product. $R_f$ value (dioxane+water 9:1)=0.75 in the thin-layer chromatogram.

The substance melts, when crystallized from acetonitrile, at 160–165° C. The UV-spectrum in ethanol exhibits maxima at λ=272 mμ (ε=36,800) and 319 mμ (ε=20,400).

Example 16

H-Lys(BOC)-Pro-Val-Gly-Lys(BOC)-Lys(BOC)-Arg-Arg-Pro-Val-Lys(BOC)-Val-Tyr-Pro-OtBu, 3CH₃COOH

A mixture of 320 mg. of PZ-tetradekapeptide tertiary butyl ester (Example 14), 6 cc. of acetic acid of 90% strength and 100 mg. of palladium-carbon catalyst of 10% strength is shaken for 5 hours with hydrogen under a pressure of 5 atmospheres (gauge). The reaction solution is then poured into a duck-shaped hydrogenation vessel and shaken for another 17 hours with 100 mg. of fresh palladium catalyst under normal conditions. To absorb the carbon dioxide formed, another duck-shaped hydrogenation vessel filled with potassium hydroxide solution is interposed. The catalyst is then filtered off and thoroughly washed with acetic acid of 90% strength and with methanol, and the whole is evaporated to dryness in vacuum to yield 220 mg. of a white amorphous powder.

The ultra-violet spectrum in absolute alcohol displays at 278 mμ the maximum (ε=1500) typical of tyrosin.

In the paper-chromatogram in the systems 49, 50 and 54 the compound migrates with the solvent front and produces positive reactions with ninhydrin and Pauly and Sakaguchi reagents.

Example 17

BOC-Ser-Tyr-Ser-Met-Glu-(OtBu)-His-Phe-Arg-Try-Gly-Lys(BOC)-Pro-Val-Gly-Lys(BOC)-Arg-Arg-Pro-Val-Lys(BOC)-Val-Tyr-Pro-OtBu 210 mg. of tetradekapeptide tertiary butyl ester (Example 16) are rapidly dissolved at 0° C. in 10 cc. of 0.1 N-hydrochloric acid and the resulting solution is subjected to lyophilization in a high vacuum. The fine, white residue is then further dried for 2 hours at 50° C. in a high vacuum over phosphorus pentoxide. At the same time, 160 mg. (0.11 millimol) of BOC-Ser-Tyr-Ser-Met-Glu(OtBu)-His-Pbe-Arg-Try-Gly-OH (afore-mentioned patent application No. 114,636) are dissolved with heating in 1 cc. of freshly distilled dimethylformamide, cooled to room temperature and added to the trihydrochloride of the tetradecapeptide, then diluted with another 2.5 cc. of dimethylformamide, and after 10–15 mintes a clear solution is obtained, which is kept for 2 hours in an ice bath. 42 mg. (0.2 millimol) of dicyclohexyl-carbodimide in 0.6 cc. of ice-cold acetonitrile are then added, and the mixture is allowed to react for 13 hours at 0° C. and then for 48 hours at room temperature. The crude reaction product is then precipitated with much ethyl acetate and dried in a high vacuum at 40° C. Yield of crude product: 330 mg.

Example 18

H-Ser-Tyr-Ser-Met-Glu-His-Phe-Arg-Try-Gly-Lys-Pro-Val-Gly-Lys-Lys-Arg-Pro-Val-Lys-Val-Tyr-Pro-OH, CH₃·COOH 100 mg. of crude, protected tetracosapeptide (Example 17; still contaminated with starting peptides) are treated for 1 hour at room temperature with 2 cc. of anhydrous trifluoro-acetic acid. The excess acid is evaporated in vacuum at room temperature and the resulting residue is triturated with much absolute ether. The amorphous scission product is subjected to continuous high voltage electrophoresis (700 volts; 30 milliamperes) in 4.5 cc. of 0.5 N-acetic acid. Rate of application: 1 cc. per hour. In all, 23 fractions are collected. The fractions 1–9, 10, 12–13, 14–15, 16 and 17–23 are evaporated. As revealed by electrophoretic analysis, the bulk of the desired tetracosapeptide is contained in fractions 12–15. For purification the combined fractions 12–15 are dissolved in 2 cc. of 0.01-molar ammonium acetate buffer and poured over a column of carboxymethylcellulose (diameter: 1 cm., height: 1.16 cm.; 2.5 grams). The carboxymethylcellulose is introduced into the column with 100 cc. of 0.01-molar ammonium acetate buffer and then eluted with another 50 cc. of the same buffer. The peptide is then eluted from the column with ammonium acetate buffer (pH=5.4) of increasing molarity (0.1-m. to 0.7-m.).

Fractions of 10 cc. volume each are collected in an automatic fraction collector. After 15 fractions, the peptide has been quantitatively removed from the column. A total of 15 fractions is obtained. The vessels 10 to 13 contain electrophoretically pure tetracosapeptide. The path covered after 1 hour at 3000 volts and pH=1.9 is 13 to 17 cm.

In the in-vitro test according to Saffran and Schally the peptide obtained reveals a considerable adrenocorticotropic activity.

Example 19

(1)          BOC-Lys(Pht)-OH 41 grams of BOC-Lys(Z)-OH (G. H. Anderson and A. C. McGregor, Jour. Am. Chem. Soc. 79, 6180 [1957]), are hydrogenated in 400 ml. of methanol of 95% strength in the presence of 4.1 grams of palladium carbon of 10% strength. After the catalyst has been filtered off, the filtrate is evaporated under reduced pressure. The foam which remains behind is dissolved in 100 ml. of absolute ethanol; from this solution BOC-L-lysine crystallizes out. A total of 24 grams=90% is obtained; melting point 204–205° C. (with decomposition). The substance can be recrystallized from a mixture of water and acetone. It is unitary in paper chromatography. The melting point does not change.

17.6 grams of the above BOC-L-lysine are dissolved in 70 ml. of water with 7.6 grams of anhydrous sodium carbonate. 19.7 grams of N-carbethoxy phthalimide are added with stirring, and the batch is stirred for another 30 minutes. The solution is filtered until it runs clear, cooled to 0° C., acidified to pH 2 with 2 N-hydrochloric acid and extracted with ethyl acetate. The ethyl acetate extracts are extracted with 120 ml. of saturated sodium bicarbonate solution and the latter acidified with 2 N-hydrochloric acid and extracted with ethyl acetate. From the ethyl acetate extracts there are obtained after washing, drying and evaporation, 26.6 grams (=99% of the theoretical yield) of a colorless glassy product. The compound is unitary in paper chromatography.

(2) Pro-OPAB, HCl 20.9 grams of BOC-L-proline and 22.7 grams of paraphenylazobenzyl alcohol are dissolved in 200 ml. of pyridine; 22 grams of dicyclohexylcarbodiimide are added at 0° C. and the whole allowed to stand overnight at room temperature. After the addition of a few ml. of glacial acetic acid, the reaction mixture is cooled to 0° C. and the dicyclohexylurea filtered with suction. After the pyridine has been evaporated the solution is washed with 0.5 N hydrochloric acid and sodium bicarbonate and the neutral product isolated. About 40 grams of a red oil are obtained.

The latter is dissolved in 100 ml. of absolute ethyl acetate, and 500 ml. of 3 N-hydrochloric acid in ethyl acetate are added. After half an hour the reaction mixture is evaporated to dryness at 40° C. under reduced pressure. The residue is dissolved in 500 ml. of chloroform and filtered through a column of 1 kg. of silica gel. A contaminant is eluted with chloroform, and the desired substance is then eluted with chloroform and methanol. (9:1). 34 grams of Pro-OPAB, HCl are obtained and recrystallized from absolute ethanol. Yield: 26.0 grams (=77% of the theoretical yield); melting point 180° C.

(3) Tyr-Pro-OPAB, HCl 1.39 grams of Pro-OPAB, HCl are dissolved in 10 ml. of water, covered with ethyl acetate and alkalinized at 0° C. with potassium carbonate. The ethyl acetate extract is washed neutral and evaporated at 40° C. under reduced pressure. The residue and 1.13 grams of BOC-Tyr-OH are dissolved in 20 ml. of acetonitrile and 1 ml. of dimethylformamide, and at 0° C. 0.91 gram of dicyclohexylcarbodiimide is added. After the batch has been allowed to stand overnight at 0° C., the dicyclohexylurea is filtered with suction, the filtrate concentrated, taken up in ethyl acetate and washed with 0.5 N hydrochloric acid and sodium bicarbonate solution. The resulting Bol-Tyr-Pro-OPAB is freed from the BOC group with hydrochloric acid in ethyl acetate. The hydrochloride crystallizes from a mixture of methanol and ether. Yield: 1.68 grams (=82% of the theoretical yield); melting point 204° C. (with decomposition).

(4) BOC-Val-Tyr-Pro-OPAB 5.0 ml. of isobutyl chlorocarbonate are added at −10° C. to −15° C. to a solution of 9 grams of BOC-Val-OH in 90 ml. of absolute tetrahydrofuran and 5.7 ml. of triethylamine. After 15 to 20 minutes, 17.25 grams of Tyr-Pro-OPAB, HCl, dissolved in 120 ml. of absolute dimethyl-formamide and 4.7 ml. of triethylamine in 45 ml. of absolute tetrahydrofuran are added dropwise simultaneously. The batch is then stirred for one hour at 0° C., allowed to stand overnight in a refrigerator, then concentrated, taken up in ethyl acetate and washed at 0° C. with 0.5 N hydrochloric acid and sodium bicarbonate solution. The resulting neutral product is recrystallized from a mixture of methanol and water. Yield: 20.15 grams of BOC-Val-Tyr-Pro-OPAB (=88% of the theoretical yield); melting point: 106–108° C.

Thin layer chromatogram: unitary in chloroform and acetone (7:3), $R_f$ 0.54.

(5) Val-Tyr-Pro-OPAB 50 ml. of trifluoracetic acid are poured over 17.0 grams of BOC-Val-Tyr-Pro-OPAB while cooling with cold water, and the batch shaken until dissolution is complete. The solution is kept for 5 minutes at room temperature, then evaporated at room temperature under reduced pressure. The oil is dissolved in chloroform, extracted once with water; the chloroform solution is then stirred at 0° C. with saturated sodium bicarbonate solution until carbon dioxide no longer evolves. The chloroform layer is separated, dried with sodium sulfate and evaporated to dryness. Yield: 14.8 grams of Val-Tyr-Pro-OPAB (=100% of the theoretical yield).

Thin-layer chromatogram—
Chloroform+acetone (7:3): unitary $R_f$ 0.2
Benzene+acetone (1:1): unitary $R_f$ 0.45

(6) BOC-Lys(Pht)-Val-Tyr-Pro-OPAB

From 7.4 grams of BOC-Lys-(Pht)-OH the mixed anhydride is prepared as described under (4) and reacted with 6.43 grams of Val-Tyr-Pro-OPAB. Yield: 9.08 grams of BOC-Lys(Pht)-Val-Tyr-Pro-OPAB (=87% of the theoretical yield).

Thin-layer chromatogram—
Chloroform+acetone (7:3): unitary $R_f$ 0.4
Benzene+acetone (1:1): unitary $R_f$ 0.62

(7) Lys-(Pht)-Val-Tyr-Pro-OPAB 9.08 grams of BOC tetrapeptide are treated with trifluoroacetic acid as described under (5) and worked up. Yield: 8:1 grams of Lys(Pht) - Val - Tyr - Pro - OPAB (=100% of the theoretical yield).

Thin-layer chromatogram—
Chloroform+acetone (7:3): unitary $R_f$ 0.16
Benzene+acetone (1:1): unitary $R_f$ 0.42

(8) BOC-Val-Lys(Pht)-Val-Tyr-Pro-OPAB

From 3.5 grams of BOC-Val-OH and 8.1 grams of Lys(Pht)-Val-Tyr-Pro-OPAB 8.8 grams of BOC pentapeptide (=88% of the theoretical yield) are obtained by the method described under (4).

(9) BOC-Val-Lys(Pht)-Val-Tyr-(Ac)-Pro-OPAB 22.2 grams of BOC-Val-Lys-(Pht)-Val-Tyr-Pro-OPAB are dissolved in 44 ml. of pyridine; 22 ml. of acetic anhydrides are added and the batch allowed to stand overnight. After precipitation with ther 20.0 grams (=88% of the theoretical yield) of the acetylated product are obtained.

Thin-layer chromatogram: unitary in chloroform and acetone (1:3), $R_f$=0.4.

(10) Val-Lys(Pht)-Val-Tyr(Ac)-Pro-OPAB 5.7 grams of BOC pentapeptide are dissolved in 60 ml. of trifluoracetic acid. After being allowed to stand for 5 minutes the trifluoracetic acid is evaporated, the residue dissolved in chloroform and washed at 0° C. with water, sodium bicarbonate and water. The chloroform is evaporated without drying. Residue: 5.2 grams (=100% of the thearetical yield).

Thin-layer chromatogram: in chloroform+methanol (95:5), $R_f$=0.35.

(11) Z-Arg-Pro-OMe·HCl 22.7 grams of proline methyl ester hydrochloride, 44.4 grams of carbobenzoxyarginine and 500 ml. of pyridine are stirred at room temperature until the whole is dissolved. 32.4 grams of dicyclohexyl-carbodiimide are then added at 0° C. and the batch stirred overnight at 0° CC. The precipitated dicyclohnexylurea is filtered with suction and the filtrate evaporated to dryness. The residue is taken up in water and ether, the aqueous solution evaporated again and the residue recrystallized from ethanol to yield 48.1 grams of dipeptide (=77% of the theoretical yield). Melting point: 164–165° C.

(12) Arg-Pro-OMe-2HCl 10 grams of Z-Arg-Pro-OMe-HCl are dissolved in 250 ml. of methanol containing about 2 equivalents of HCl gas, and hydrogenated in the presence of 1 gram of palladium carbon of 10% strength. The solution is evaporated to dryness and the residue dried over potassium hydroxide under reduced pressure. Yield: 7.83 grams (=100% of the theoretical yield). Paper chromatogram: $R_f$ 0.31 in the system isopropanol:formic acid: water (40:2:10), indicator, Sakaguchi reagent.

(13) BOC-Arg-Arg-Pro-OMe, 2CH₃COOH 9.35 grams of BOC-Arg-OH are dissolved with 3.6 grams of anhydrous toluenesulfonic acid in 7 ml. of dimethylformamide and 70 ml. of tetrahydrofuran. After cooling to −10° C., 2.9 ml. of triethylamine and 2.58 ml. of isobutyl chlorocarbonate are added in succession and the batch stirred for 15 minutes. 5 grams of Arg-Pro-OMe-2HCl dissolved in 30 ml. of dimethylformamide and 1.94 of triethylamine dissolved in 10 ml. of tetrahydrofuran are then added dropwise and the batch stirred for 5 hours at 0° C. The triethylammonium chloride which crystallizes out is filtered with suction, the filtrate concentrated and precipitated with ether. The resulting crude product is purified by chromatography on carboxymethyl cellulose. For this purpose the crude product is dissolved in water, treated with Amberlite IRA-400 (acetate form) until no chlorine ions can be detected and then poured on a column of 120 grams of carboxymethyl cellulose. The column is eluted in succession with 800 ml. of 0.01 N acetic acid, 6.5 litres of 0.05 N acetic acid and 2 litres of 0.1 N acetic acid. Fractions of 400 ml. are collected and the purity examined by paper chromatography. Fractions 12 to 16 are pure. They yield 6.87 grams=74% of the theoretical yield. Paper chromatogram: $R_f$=0.6 in the system isopropanol:formic acid:water (40:2:10); indicator: Sakaguchi.

(14) BOC-Arg-Arg-Pro-OH, 2-para-toluene-sulfonic acid 6.07 g. of BOC-Arg-Arg-Pro-OMe, 2CH₃COOH are dissolved in 12 ml. of water and kept at room temperature for 30 minutes with 115 ml. of 0.4 N barium hydroxide solution. On addition of the calculated amount of sulfuric acid, the barium sulfate precipitates and is centrifuged off. The aqueous solution is adjusted to pH 3.6 with a pH meter with a 10% toluene sulfonic acid solution and then evaporated to dryness under reduced pressure. Residue: 7.61 g.=95% of the theoretical yield. Paper chromatogram: unitary in isopropanol+ formic acid+water (40:2:10), $R_f$ 0.65; indicator, Sakaguchi reagent. Molecular weight, determined by titration with sodium hydroxide 900 (calculated: 872).

(15) BOC-Arg-Arg-Pro-Val-Lys-Pht-Val-Tyr-Ac-Pro-OPAB 3,33 g. of Val-Lys(Pht)-Val-Tyr(Ac)-Pro-OPAB and 4.2 g. of BOC-Arg-Arg-Pro-OH, 2TOSOH are dissolved in 30 ml. of pyridine and treated with 1.06 g. of dicyclohexyl-carbodiimide. The mixture is left to itself overnight, and the dicyclohexyl urea then filtered off and the filtrate evaporated to dryness under reduced pressure. The residue is dissolved in chloroform+methanol (9:1) and the solution washed several times with water. Without first being dried, the solution is evaporated, the residue dissolved in a small amount of ethanol, and the peptide ester precipitated with ether. Yield: 5.16g.= 82% of the theoretical yield.

Thin layer chromatogram: $R_{f100}$=0.35 on silica gel; indicators: Sakaguchi reagent, iodine.

(16) Arg-Arg-Pro-Val-Lys-Pht-Val-Tyr-Ac-Pro-OPAB

From 5.15 g. of BOC-octapeptide, 4.7 g. of BOC-free octapeptide are obtained by the method (described under 10) above, and purified by chromatography over carboxy methyl cellulose. The crude substance is dissolved in 100 ml. of 50% tertiary butanol and filtered through a column, having a diameter of 3.5 cm. and a height of 29 cm., of an ion exchanger. There are then successively eluted: slight impurities with 200 ml. each of 50% tertiary butanol+2 N acetic acid (19:1), (9:1), and (4:1), and the pure substance with 50% tertiary butanol+glacial acetic acid (9:1). Yield: 3.35 g.=76% of the theoretical yield. Thin layer chromatogram: $R_{f102}$=0.4 on alumina; indicators: Sakaguchi reagent, iodine.

(17) BOC-Lys(Pht)-Pentachlorophenyl ester 50.9 grams of BOC-Lys(Pht)-OH and 43.2 grams of pentachlorophenol are dissolved in 160 ml. of absolute ethyl acetate and treated with 30.7 grams of dicyclohexylcarbodiimide at 0° C. After the reaction mixture has been allowed to stand overnight at 0° C., the dicyclohexylurea is filtered off with suction and washed well with ice-cold ethyl acetate. The filtrate is evaporated to dryness in vacuo and the residue recrystallized from 500 ml. of ethanol. A first fraction of 40.8 grams of pentachlorophenyl ester melting at 140–142° C. is obtained.

From the mother liquor a second fraction of 16.7 grams is obtained; total 68% of the theory.

For the purpose of analysis the reaction product is recrystallized again from ethanol, whereupon the melting point is 142–143° C.

(18) BOC-Lys(Pht)-Arg-Arg-Pro-Val-Lys
(Pht)-Val-Tyr-Pro-OPAB, 2CH₃COOH 1.06 grams of Arg-Arg-Pro-Val-Lys(Pht)-Val-Tyr-Pro-OPAB, 3CH₃COOH, 850 mg. of BOC-Lys(Pht)- pentachlorophenyl ester, 2.5 ml. of dimethylformamide and 0.094 ml. of triethylamine are stirred for 17 hours at 40° C. After dilution with chloroform the protected nonapeptide ester is precipitated with ether, suction filtered and well washed with ether. Yield: 1.24 grams= 98% of the theory.

Thin-layer chromatogram: Unitary in the system ethyl acetate+methylethylketone+formic acid+water, 5:3: 1:1. $R_f$=0.4.

(19) BOC-Lys-(Pht)-Arg-Arg-Pro-Val-Lys-
(Pht)-Val-Tyr-Ac-Pro-OPAB 1.06 g. of octapeptide 3 acetic acid (described under 16) above, and 850 mg. of $N^\alpha$-BOC-N-phthalyl-lysin-pentachlorophenyl ester are stirred at 40° C. for 20 hours in 2.5 ml. of dimethylformamide containing 0.094 ml. of triethylamine. The nonapeptide is then precipitated with ether. Yield: 1.29 g.=100% of the theoretical yield. Thin layer chromatogram on silica gel., $R_{f102}$=0.4; indicator; iodine.

(20) Lys-Pht-Arg-Arg-Pro-Val-Lys-Pht-Val-Tyr-Ac-Pro-OPAB

From 1.29 g. of BOC-nonapeptide the BOC group is split off with trifluoracetic acid by the method described under (10) above. Yield: 1.4 g. of tri-trifluoracetate=83% of the theoretical yield. Thin layer chromatogram on alumina $R_{f102}$=0.8; indicator: iodine.

(21) BOC-Lys-(Pht)-Lys-(Pht)-Arg-Arg-Pro-
Val-Lys-(Pht)-Val-Tyr-(Ac)

1.14 g. of nonapeptide 3 trifluoracetic acid and 720 mg. of $N^\alpha$-BOC-$N^\epsilon$-phthalyl-lysin-pentachlorophenyl ester are kept at 40° C. for 17 hours in 2.2. ml. of dimethyl formamide and 0.08 ml. of triethylamine. The decapeptide is then precipitated with ether. Yield: 1.12 g.=87% of theoretical yield. Thin layer chromatogram on silica gel: $R_{f102}=0.6$; indicator: iodine.

(22) Lys-(Pht)-Lys-(Pht)-Arg-Arg-Pro-Val-Lys (Pht)-Val-Tyr-(Ac)-Pro-OPAB

From 1.12 g. of BOC-decapeptide the BOC group is split off by the method (described under 10) above. Yield: 1.07 g.=100% of the theoretical yield. Thin layer chromatogram on silica gel: $R_{f102}=0.25$; indicator: iodine.

(23) BOC-Val-Gly-OH 14 g. of BOC-valin-para-nitrophenyl ester, 9.3 g. of glycine, 100 ml. of water and 200 ml. of tetrahydrofuran are stirred with so much 3.96 N sodium hydroxide solution that the mixture always has a pH of 9.0. After 12 hours, the consumption of sodium hydroxide solution ceases. The pH is adjusted to 7.2, the solution extracted with ether, then acidified to pH 2 at 0° C., and extracted with ethyl acetate. From the ethyl acetate solution, there are obtained with dicyclohexylamine, 9.5=50% of the theory, of the crystalline dicyclohexyl ammonium salt. Melting point: 172–174° C. From the salt, the BOC-Val-Gly-OH is obtained by acidification with citric acid and extraction with ethyl acetate.

(24) BOC-Val-Gly-Lys-(Pht)-Lys-(Pht)-Arg-Arg-Pro-Val-Lys-(Pht)-Val-Tyr-(Ac)-Pro-OPAB 304 mg. of BOC-Val-Gly-OH are dissolved in 3 ml. of absolute tetrahydrofuran and 0.15 ml. of triethylamine, the solution treated at −10° C. with 0.13 ml. of isobutyl chlorocarbonate and kept at this temperature for 15 minutes. A solution of 1.07 g. of decapeptide in 2 ml. of dimethyl formamide is then added, and the whole stirred for 5 hours at 0° C. On precipitation with ether, 1.049 g. of BOC-dodecapeptide are obtained=87% of the theoretical yield. Thin layer chromatogram on silica gel: $R_{f102}=0.55$; indicator: iodine.

(25) Val-Gly-Lys-(Pht)-Lys-(Pht)-Arg-Arg-Pro-Val-Lys-(Pht)-Val-Tyr-(Ac)-Pro-OPAB

From 1.04 g. of BOC-dodecapeptide there is obtained by the method (described under 10) above, 1.0 g.=100% of the theoretical yield, of dodecapeptide. Thin layer chromatogram on silica gel: F $R_{f102}=0.2$; indicator: iodine.

(26) BOC-Lys-(Pht)-Pro-OBzy

A suspension of 4 g. of proline-benzyl ester hydrochloride in 20 ml. of acetonitrile is treated in rapid succession with 2.29 ml. of triethylamine, a solution of 6.21 g. of $N^{\alpha}$-BOC-$N^{\epsilon}$-phthalyl-lysin in 10 ml. of acetonitrile and 4.09 g. of dicyclohexylcarbodiimide. The batch is stirred overnight, the dicyclohexyl urea filtered off with suction, the filtrate concentrated under reduced pressure, taken up in ethyl acetate, and extracted successively with hydrochloric acid, sodium bicarbonate, and water. On evaporation of the solvent, 9.67 g. of a non-crystalline resin remain. Paper chromatogram: After splitting off the BOC group with HCl, unitary in isopropanol+formic acid+water (40:2:10) $R_f$ 0.8; indicator: ninhydrin.

(27) BOC-Lys-(Pht)-Pro-OH 2.0 g. of the above benzyl ester are dissolved in 20 ml. of methanol and the solution hydrogenated in the presence of 200 mg. of 10% palladium carbon. The catalyst is filtered off and the solvent evaporated under reduced pressure, the residue dissolved in ethyl acetate and the solution exhaustively extracted with sodium bicarbonate solution. The extracts are combined and acidified, and extracted with ethyl acetate. On evaporation of the solvent there remain behind 1.14 g. of an oil=68% of the theoretical yield. The product is used without further purification.

(28) BOC-Lys-(Pht)-Pro-Val-Gly-Lys-(Pht)-Lys-(Pht)-Arg-Arg-Pro-Val-Lys-(Pht)-Val-Tyr-(Ac)-Pro-OPAB 490 mg. of BOC-Lys(Pht)-Pro-OH are dissolved in 4 ml. of tetrahydrofuran and 0.14 ml. of triethylamine, the solution treated at −10° C. with 0.12 ml. of isobutyl chlorocarbonate, and stirred for 15 minutes. 1.0 g. of Val - Gly - Lys(Pht) - Lys(Pht) - Arg - Arg - Pro - Val-Lys(Pht)-Val-Tyr(Ac)-Pro-OPAB, dissolved in 5 ml. of dimethyl formamide is then added dropwise and the mixture kept at 0° C. overnight. The tetradecapeptide is then precipitated with ether. Yield: 1.15 g.=96% of the theoretical yield.

(29) Lys(Pht)-Pro-Val-Gly-Lys(Pht)-Lys(Pht)-Arg-Arg-Pro-Val-Lys(Pht)-Val-Tyr(Ac)-Pro-OPAB

As described under (10) above, 1.15 g. of BOC-tetradecapeptide are treated with trifluoracetic acid. In 50% tertiary butanol the resulting trifluoracetate is filtered through a column of Amberlite IRA–400 (acetate form). Evaporation of the solvent yields 1.03 g.=95% of the theoretical yield of tetradecapeptide, 3 acetic acid. This product is purified by chromatography on carboxy methyl cellulose. Elution with 50% tertiary butanol-2 N acetic acid (90:10) gives 980 mg.=peptide ester=90% of the theoretical yield. Further purification is effected by chromatography on 50 g. of silica gel. The product is washed with ethyl acetate+methylethyl ketone+formic acid+water (5:3:1:1) until two faint zones separate from the main zone. The column is then removed from the container and the main zone separated. The substance is extracted from the silica gel with methanol+formic acid (3:1). In this manner, 590 mg.=54% of the theoretical yield of pure tetradecapeptide ester are obtained. Thin layer chromatogram on silica gel, $R_{f102}=0.2$; indicator: iodine.

By treatment with excess hydrochloric acid the trihydrochloride is prepared.

(30) BOC-Ser-Tyr-Ser-Met-Glu(OtBu)-His-Phe-Arg-Try-Gly-Lys(Pht)-Pro-Val-Gly-Lys(Pht)-Lys(Pht)-Arg-Arg-Pro-Val-Lys(Pht)-Val-Tyr-(Ac)-Pro-OPAB 100 mg. of tetradecapeptide trihydrochloride, 89 mg. of BOC-Ser-Tyr-Ser-Met-Glu(OtBu)-His-Phe - Arg-Try-Gly-OH, 0.5 ml. of pyridine, and 25 mg. of dicyclohexyl carbodiimide are stirred at 25–30° C. for 66 hours. After 20 hours, another 15 mg. of dicyclohexyl carbodiimide in 0.5 ml. of pyridine are added. When the reaction is complete, the dicyclohexyl urea is filtered off with suction, and the tetracosapeptide derivative precipitated with ether. The crude product is converted into the acetate and then purified with carbovymethyl cellulose. It is eluted with a gradient of 50% tertiary butanol and 50% tertiary butanolacetic acid (96:4). The resulting fractions are examined by means of thin layer chromatography. The pure fractions are combined and evaporated. Yield: 90 mg.=56% of the theoretical yield.

Thin layer chromatogram on silica gel, $R_{f100}=0.15$; indicator: Reindel-Hoppe reagent.

(31) Ser-Tyr-Ser-Met-Glu-His-Phe-Arg-Try-Gly-Lys-Pro-Val-Gly-Lys-Lys-Arg-Arg-ProVal-Lys-Val-Tyr-Pro-NHNH$_2$ 70 mg. of the protected tetracosapeptide are treated with trifluoracetic acid for 1 hour, then precipitated with ether. The resulting trifluoracetate is heated at 50° C. for 20 hours with 5 ml. of a methanolic solution which is 2-molar with respect to hydrazine monoacetate. The solvent is evaporated under reduced pressure, the residue dissolved in a small amount of acetone and, after 30 hours, precipitated with ether. Crude product: 52 mg. After conversion into the acetate, peptide is purified by chromatography on carboxymethyl cellulose. Elution is performed with a gradient from 0.05 molar to 0.6 molar of ammonium acetate of pH 6.8. The various fractions are examined as to unitariness by means of paper electrophoresis. The pure fractions are combined and lyophilized. Yield: 191.1 mg.=33% of the theoretical yield.

Paper electrophoresis: Pyridine acetate pH 6, 200 v., 10 hours; distance traveled, 18.5 cm.; indicator: ninhydrin. Thin layer chromatogram: n-butanol+pyridine+glacial acetic acid+water (30:20:6:24). $R_f$ 0.6 on alumina; 0.45 on silica gel. Indicators: Pauly, Reindel-Hoppe.

Example 20

A solution of 5.1 mg. (about $1.5 \times 10^{-6}$ mol) of the above tetracosapeptide in 2.0 ml. of 0.1 N-potassium chloride solution is treated with 0.020 ml. of 0.1 N-hydrochloric acid and 0.020 ml. of 0.1-molar zinc sulfate solution. The solution thus contains: HCl, $2 \times 10^{-6}$; $Zn^{+2}$, $2 \times 10^{-6}$ mol; tetracosapeptide, about $1.5 \times 10^{-6}$ mol.

The solution is titrated with 0.1 N-sodium hydroxide solution. The titration curve shows a zinc complex with pH=8.35. At and above pH of 8.35, the sparingly soluble complex begins to precipitate in the form of a very finely divided gel. It is centrifuged off at a pH of 9.5 and washed with water. The complex has a strong ACTH-activity.

Example 21

1 injection vial contains:

|  | (a) | (b) |
| --- | --- | --- |
| 30920,* mg | 1 | 3 |
| Mannitol, mg | 10 | 10 |

*30920=H-Ser-Tyr-Ser-Met-Glu-His-Phe-Arg-Try-Gly-Lys-Pro-Val-Gly-Lys-Arg-Arg-Pro-Val-Lys-Val-Tyr-Pro-OH, $CH^3COOH$.

*Method.*—30920 and mannitol are dissolved in water for the purpose of injection, so that 1.0 ml. of solution contains 1 mg. and 3 mg. of 30920 respectively and 10 mg. of mannitol. The solution is filtered under sterile conditions and is put into sterilized injection vials of 1.0 ml., each under aseptic conditions and lyophilized in the conventional manner. The vials are then sealed under aseptic conditions.

Example 22

1.25 mg. of $\beta^{1-24}$-corticotropin (100 units/mg.) are dissolved in 2 ml. of water and 2 ml. of 0.1-molar zinc chloride solution (pH 5.5 to 6.0), whereupon 1.28 ml. of 0.1-molar sodium phosphate solution are added (final pH=6.9–7.1). The gelatinous suspension is made up with saline (activity about 25 units/ml.) to a final volume of 5 ml.

The suspension is then mixed with a preservative, for example phenol, and a stabiliser, such as sodium carbomethyl-cellulose, or with another soluble derivative, glycerol or polyvinylpyrrolidone.

Alternatively, the gelatinous product may be freeze-dried and suspended in a vegetable or synthetic oil.

Example 23

1.25 mg. of $\beta^{1-24}$-corticotropin (100 units/mg.) are dissolved in 2 ml. of water and 0.5 ml. of 0.1-molar zinc chloride solution (pH 5.7–6.6) and mixed with 0.33 ml. of 0.1-molar sodium phosphate solution (final pH=6.9–7.1). The whole is made up with saline to 5 ml. (activity about 25 units/ml.) and then further worked up as described in Example 22.

Example 24

1.25 mg. of $\beta^{1-24}$-corticotropin (100 units/mg.) are dissolved in 2 ml. of water and 0.5 ml. of 0.1-molar zinc chloride solution and mixed with 1 ml. of 0.1-molar sodium hydroxide solution (pH 7). The gelatinous precipitate is made up with saline to a final volume of 5 ml. Further working up is performed as described in Example 22.

Example 25

2.4 mg. of $\beta^{1-24}$-corticotropin are dissolved in 2 ml. of 0.1-molar zinc chloride solution, mixed with 120 mg. of mannitol and made up with water to 10 ml. The product is precipitated with 4 ml. of 0.1-molar sodium hydroxide solution on zinc hydroxide and finally freeze-dried.

The product can be suspended in saline to the desired activity.

Alternatively, the product can be suspended in sesame or arachis oil or in a synthetic oil with a fatty acid of 8 to 12 carbon atoms and a preservative may be incorporated in the suspension.

Example 26

2.4 mg. of $\beta^{1-24}$-corticotropin are dissolved in 4 ml. of 0.1-molar zinc chloride solution, mixed with 120 mg. of mannitol and made up with water to 10 ml. The product is precipitated with 8 ml. of 0.1-molar sodium hydroxide solution on zinc hydroxide and finally freeze-dried.

Example 27

0.5 mg. of $\beta^{1-24}$-corticotropin hexaacetate, 19.16 mg. of zinc sulfate ($ZnSO_4 + 7H_2O$), and 16.0 mg. of mannitol are dissolved in distilled water so that the volume obtained is 0.5 ml.

The resulting solution is freeze-dried. When to the above lyophilisate 1.0 ml. of an aqueous solution containing 19.0 mg. of tertiary sodium phosphate $$(Na_3PO_4 + 12H_2O)$$

and 2.0 mg. of Versene Fe-3 (mixture of 93% by weight of a 34% aqueous solution of the tetrasodium salt of ethylenediamine tetraacetic acid and 7% by weight of the monosodium salt of N,N-di-(2-hydroxyethyl)-glycine) is added an isotonic suspension is formed.

Example 28

0.5 mg. of $\beta^{1-24}$-corticotropin hexaacetate, 19.16 mg. of zinc sulfate ($ZnSO_4 + 7H_2O$) and 5.0 mg. of sodium chloride are dissolved in water. After the addition of 15.0 mg. of benzyl alcohol, the solution is treated with 0.1 ml. of n-NaOH and the quantity of distilled water necessary to obtain 1.0 ml. of suspension.

Example 29

In an analogous way as described in Example 27 ampoules containing the following components are prepared.

(1) Lyophilized ampoule of 2 ml. capacity:

| | Mg. |
| --- | --- |
| $\beta^{1-24}$-corticotropin hexaacetate | 0.25 |
| $ZnSO_4 + 7H_2O$ | 9.58 |
| Mannitol | 33.00 |
| "Tween 60" | 2.00 |

(2) Solution ampoule of 1 ml. capacity:

| | |
| --- | --- |
| $Na_3PO_4 + 12H_2O$ | 9.5 mg. |
| Aqua dest. | To make up 1.0 ml. |

When the contents of the solution ampoule is given to the lyophilized amopule an isotonic suspension having a pH of about 7.5 is obtained.

Example 30

Two solution ampoules are prepared having the following components.

(1) Solution ampoule of 2 ml. capacity:

| | |
| --- | --- |
| $\beta^{1-24}$-corticotropin hexaacetate | 0.25 mg. |
| $ZnSO_4 + 7H_2O$ | 9.58 mg. |
| Mannitol | 33.0 mg. |
| "Tween 60" | 2.0 mg. |
| Aqua dest. | To make up 0.5 ml. |

(2) Solution ampoule of 1 ml. capacity:

| | |
| --- | --- |
| $Na_3PO_4 + 12H_2O$ | 9.5 mg. |
| Aqua dest. | To make up 0.5 ml. |

The suspension obtained on mixing the contents of the two ampoules has a pH of about 7.5.

Example 31

A lyophilized ampoule having the same composition as in Example 29 is prepared. The solution ampoule contains 1.80 mg. of sodium hydroxide (100%) and distilled water to make up 1.0 ml. The isotonic suspension obtained on adding the contents of the solution ampoule to the lyophilized ampoule has a pH of about 7.5.

Example 32

In an analogous way as described in Example 27 ampoules containing the following components are prepared:

(1)

|  | Mg. |
|---|---|
| $\beta^{1-24}$-corticotropin hexaacetate | 0.25 |
| $ZnSO_4 + 7H_2O$ | 9.58 |
| Mannitol | 38.0 |
| "Tween 60" | 2.0 |
| Water-soluble sodium carboxymethyl cellulose | 1.0 |

(2)

| Sodium hydroxide (100%) | 1.8 mg. |
|---|---|
| Aqua dest. To make up | 1.0 ml. |

Example 33

A lyophilized ampoule having the same composition as in Example 32 is prepared. The solution ampoule contains 9.50 mg. of $Na_3PO_4 + 12H_2O$ and distilled water to make up 1 ml.

Example 34

A solution is prepared which contains:

| $\beta^{1-24}$-corticotropin hexaacetate | 0.25 mg. |
|---|---|
| $ZnSO_4 + 7H_2O$ | 9.58 mg. |
| "Tween 60" | 2.00 mg. |
| Mannitol | 37.50 mg. |
| Aqua dest. To make up | 0.5 ml. |

A solution is prepared which constains:
distilled water is added and the resulting suspension lyophilized in a two-ml. ampoule.

Example 35

Suspensions of the following compositions are prepared:

(a)

| $\beta^{1-24}$-corticotropin hexaacetate | 0.25 mg. |
|---|---|
| $ZnSO_4 + 7H_2O$ | 9.58 mg. |
| Sodium chloride | 5.40 mg. |
| Water soluble sodium carboxymethyl cellulose | 10.00 mg. |
| "Tween 60" | 0.04 mg. |
| Phenol | 5.00 mg. |
| Sodium hydroxide (98.5%) | 1.00 mg. |
| Aqua dest. To make up | 1.0 ml. |

(b)

| $\beta^{1-24}$-corticotropin hexaacetate | 0.25 mg. |
|---|---|
| $ZnSO_4 + 7H_2O$ | 4.76 mg. |
| Sodium chloride | 5.40 mg. |
| Water soluble sodium carboxymethyl cellulose | 10.00 mg. |
| "Tween 60" | 0.04 mg. |
| Phenol | 5.00 mg. |
| Sodium hydroxide (98.5%) | 1.00 mg. |
| Aqua dest. To make up | 1.0 ml. |

Example 36

0.25 mg. of $\beta^{1-24}$-corticotropin and 9.58 mg. of zinc sulfate ($ZnSO_4 + 7H_2O$) are dissolved in 0.8 ml. of water. To this solution 0.12 ml. of an aqueous solution of sodium carbonate ($Na_2CO_3 + 10H_2O$) of 10% strength are added and distilled water to make up 1.0 ml., the suspension has a pH-value of 7.0.

The complex compounds described in Examples 22 to 37 display in the Sayer test a distinctly prolonged action compared with free $\beta^{1-24}$-corticotropin.

Example 37

2 mg. of $\beta^{1-24}$-corticotropine hexaacetate are dissolved in 2 ml. of methanol and 5 ml. of a methanolic solution containing 0.53 mg. of zinc ($ZnSO_4 + 7H_2O$) are added precipitation taking place. The precipitate is centrifuged off, washed with methanol and dried in a high vacuum at room temperature. The finely pulverized product is suspended in 4 ml. of an injectable oil, for example sesame oil or arachis oil.

1 ml. of the suspension corresponds to 50 I.U. of corticotropine.

Example 38

2 mg. of $\beta^{1-24}$-corticotropine hexaacetate are dissolved in 2 ml. of methanol and 5 ml. of a methanolic solution containing 0.88 mg. of zinc sulphate ($ZnSO_4 + 7H_2O$), are added precipitation taking place. The precipitate is centrifuged off, washed with methanol and dried in a high vaccum at room temperature. The finely pulverized product is suspended in 8 ml. of an injectable oil, for example sesame oil or arachis oil.

1 ml. of the suspension corresponds to 25 I.U. of corticotropine.

What is claimed is:

1. A pharmaceutical preparation comprising an effective amount of a member selected from the group consisting of the tetracosapeptide of the formula L-seryl-L-tyrosyl-L - seryl-L-methionyl-L - glutamyl-L-histidyl-L-phenylalanyl-L-arginyl-L - tryptophyl-glycyl-L - lysyl-L-prolyl-L - valyl-glycyl-L - lysyl-L-lysyl-L - arginyl-L-arginyl-L - prolyl-L-valyl-L - lysyl-L-valyl-L - tyrosyl-L-proline and its non-toxic acid addition salts and a pharmaceutical carrier.

2. A pharmaceutical preparation comprising an effective amount of a member selected from the group consisting of the tetracosapeptide of the formula L-seryl-L-tyrosyl-L - seryl-L-methionyl-L - glutaminyl-L-histidyl-L-phenylalanyl-L - arginyl-L-tryptophyl-glycyl-L - lysyl - L-prolyl-L - valyl-glycyl - L-lysyl - L-lysyl - L-arginyl-L-arginyl - L - prolyl - L - valyl-L-lysyl-L-valyl-L-tyrosyl-L-proline and its non-toxic acid addition salts and a major amount of a pharmaceutical carrier.

3. A pharmaceutical preparation comprising an effective amount of a zinc complex of L-seryl-L-tyrosyl-L-seryl-L - methionyl-L - glutamyl-L - histidyl-L-phenylalanyl-L - arginyl-L - tryptophyl-glycyl-L - lysyl-L - prolyl-L-valyl-glycyl-L - lysyl-L-lysyl-L-arginyl-L - arginyl - L-prolyl-L-valyl-L-lysyl-L - valyl-L-tyrosyl-L-proline and a major amount of a pharmaceutical carrier.

4. A pharmaceutical preparation comprising an effective amount of a complex consisting of L-seryl-L-tyrosyl-L-seryl-L - methionyl-L - glutamyl-L - histidyl - L-phenylalanyl-L - arginyl-L-tryptophyl-glycyl-L - lysyl-L - prolyl-L-valyl-glycyl-L - lysyl-L- lysyl-L - arginyl-L-arginyl-L-prolyl-L - valyl-L - lysyl-L - valyl-L-tyrosyl-L-proline and a sparingly soluble zinc compound, the weight proportion of zinc to the tetracosapeptide being 400–1000 gram equivalents of zinc per gram mol of the tetracosapeptide and a major amount of a pharmaceutical carrier.

References Cited by the Examiner

Hoffman: J.A.C.S., vol. 79, pp. 1636–41; 6087–88 (1957).

Schwyzer: Nature, vol. 182, pp. 1669–70 (1958).

Shepherd: J.A.C.S., vol. 78, pp. 5067–76 (1956).

LEWIS GOTTS, *Primary Examiner.*

PERRY A. STITH, *Assistant Examiner.*